(12) United States Patent
Holm et al.

(10) Patent No.: US 11,772,844 B2
(45) Date of Patent: Oct. 3, 2023

(54) REUSABLE BIN ASSEMBLY

(71) Applicant: Kenneth R Moras Pty Ltd, Wetherill Park (AU)

(72) Inventors: Jason Holm, Wetherill Park (AU); John Rafferty, Wangi Wangi (AU)

(73) Assignee: Kenneth R Moras Pty Ltd., Wetherill Park (AU)

( * ) Notice: Subject to any disclaimer, the term of this patent is extended or adjusted under 35 U.S.C. 154(b) by 0 days.

(21) Appl. No.: 17/964,680

(22) Filed: Oct. 12, 2022

(65) Prior Publication Data
US 2023/0041887 A1 Feb. 9, 2023

Related U.S. Application Data

(63) Continuation of application No. 16/643,811, filed as application No. PCT/AU2018/000159 on Aug. 31, 2018, now Pat. No. 11,505,366.

(30) Foreign Application Priority Data

Aug. 31, 2017 (AU) .................................. 2017903511

(51) Int. Cl.
*B65D 19/18* (2006.01)
*B65D 19/38* (2006.01)

(52) U.S. Cl.
CPC ............. *B65D 19/18* (2013.01); *B65D 19/38* (2013.01); *B65D 2519/00034* (2013.01); *B65D 2519/00069* (2013.01); *B65D 2519/00273* (2013.01); *B65D 2519/00288* (2013.01); *B65D 2519/00333* (2013.01); *B65D 2519/00338* (2013.01); *B65D 2519/00572* (2013.01); *B65D 2519/00661* (2013.01)

(58) Field of Classification Search
CPC .................... B65D 19/38; B65D 19/18; B65D 2519/00661; B65D 2519/00338; B65D 2519/00333; B65D 2519/00288; B65D 2519/00572; B65D 2519/00273; B65D 2519/00069; B65D 2519/00034
USPC ....... 206/521.1, 600; 220/913, 908; 108/137
See application file for complete search history.

(56) References Cited

U.S. PATENT DOCUMENTS

| 4,775,068 | A | * | 10/1988 | Reiland | .................. | B65D 19/18 |
| | | | | | | 220/6 |
| 5,074,572 | A | * | 12/1991 | Delmerico | ............ | B62B 5/0083 |
| | | | | | | 280/79.5 |
| 5,105,947 | A | * | 4/1992 | Wise | .................. | B65D 21/0223 |
| | | | | | | 220/625 |

(Continued)

*Primary Examiner* — Rafael A Ortiz
(74) *Attorney, Agent, or Firm* — Quarles & Brady LLP

(57) ABSTRACT

A bin assembly includes a container and a pallet. The container has a base and sidewalls that extend upwardly and outwardly from the base. The base includes a centrally disposed alignment means and at least one spaced apart locking portion. The pallet includes a centrally disposed alignment means that is complementary to the container alignment means and at least one spaced apart locking mechanism disposed on the pallet and that is complementary to the at least one spaced apart locking portion. The at least one spaced apart locking mechanism is configured to engage or disengage the at least one spaced apart locking portion upon relative rotation between the container and the pallet to respectively lock or unlock the pallet and the container.

9 Claims, 12 Drawing Sheets

(56) References Cited

U.S. PATENT DOCUMENTS

| | | | | |
|---|---|---|---|---|
| 8,434,618 B2* | 5/2013 | Mitchell | ............... | B65D 19/06 |
| | | | | 206/386 |
| 9,132,937 B2* | 9/2015 | Ritzberger | ........... | B65D 21/083 |
| 9,714,116 B2* | 7/2017 | Rader | ................ | B65D 19/0016 |
| 2008/0105583 A1* | 5/2008 | Stahl | ................. | B65D 21/0216 |
| | | | | 206/506 |
| 2009/0127158 A1* | 5/2009 | Apps | ...................... | B65D 19/06 |
| | | | | 206/600 |
| 2015/0108037 A1* | 4/2015 | Evans | ................... | B65D 19/18 |
| | | | | 108/50.11 |
| 2018/0201404 A1* | 7/2018 | Lam | ..................... | B65D 5/4803 |

* cited by examiner

REUSABLE BIN ASSEMBLY

CROSS REFERENCE TO RELATED APPLICATIONS

This application is a continuation of U.S. application Ser. No. 16/643,811, filed on Mar. 2, 2020, which represents the U.S. National Stage application, filed pursuant to 35 U.S.C. § 371, of international application number PCT/AU2018/000159, filed on Aug. 31, 2018, which claims priority to Australian Provisional Application No. 2017903511, filed on Aug. 31, 2017, each of which is incorporated herein by reference in its entirety.

FIELD

The present invention relates to a reusable bin assembly, and in particular, to a reusable bin assembly for transporting produce.

BACKGROUND

Reusable bins, and in particular, reusable bins for transporting produce and other perishable foods, are known. The bins can be used to transport the food items from the grower to customers, or alternatively, the food items, such as fruit, may be picked from an orchard and put in the bins for transport to a farm where it is stored before being packed into other containers. Often the bins are hired from a supplier for seasonal fruit picking and are required to be returned at the end of the season. One obstacle when transporting produce such as oranges, apples or other roundish fruit or vegetable is that they tend to roll which can cause bruising. Another obstacle to address is to minimise the cost of returning empty bins. Because the empty bins incur a cost for transport it would be desirable to optimise the number of empty bins that can be accommodated within a truck. Additionally, normal wear and tear of the bins can result in damage thus it would also be desirable to provide an improved bin with a lower cost replacement option.

OBJECT OF THE INVENTION

It is the object of the present invention to substantially overcome or ameliorate one or more of the disadvantages of the prior art, or to at least provide a useful alternative.

SUMMARY OF INVENTION

In one embodiment the present invention provides a bin assembly including:
- a container having a base and at least one sidewall extending upwardly and outwardly from the base;
- at least one locking portion disposed on the base;
- a pallet; and
- at least one locking mechanism disposed on the pallet, complementary to the at least one locking portion, wherein relative rotation between the container and the pallet engages or disengages the locking portions to respectively lock or unlock the pallet and the container.

Preferably, the container includes a first locating portion and the pallet includes a second locating portion, complementary to the first locating portion, so that in use the locating portions cooperate to facilitate alignment between the pallet and the container.

Preferably, the first locating portion is pivotable within the second locating portion for engagement/disengagement of the locking portions.

Preferably, the at least one locking mechanism extends between adjacent sidewalls of the pallet so that rotation of the container relative to the pallet causes locking/unlocking of the pallet and the container.

Preferably, the at least one locking porting includes a locking portion disposed on each corner portion of the container, and the at least one locking mechanism includes a locking mechanism extending between adjacent sidewalls of the pallet.

Preferably, the container includes a plurality of apertures uniformly distributed along the base and the sidewalls to facilitate continuous airflow within the container.

Still preferably, the plurality of apertures covers 60-80 percent of the base and sidewalls.

Preferably, the at least one locking mechanism includes biasing means configured to urge the at least one locking portion into engagement with the at least one locking mechanism.

In one embodiment, the biasing means includes a spring housed within an aperture. Preferably, the spring includes a pair of arm portions disposed on either side of the aperture.

Preferably, the at least one locking portion includes a plurality of locking posts removably attachable to the container.

Preferably, each locking post is slidably received within a locking mechanism.

Preferably, like pallets are configured to stack and like containers are configured to nest.

A second embodiment of the present invention provides a container removably attachable to a pallet having at least one locking mechanism at a locating portion, the container including:
- a base;
- side walls extending upwardly and outwardly from the base;
- at least one locking portion disposed on the base and configured to engage the at least one locking mechanism on the pallet; and
- a locating member extending downwardly from the base, wherein the locating member is receivable within the locating portion of the pallet.

Preferably, the sidewalls of the container include a corrugated profile defined by a series of horizontal wave-like curves. This geometry increases impact strength.

Preferably, adjacent side walls of the container meet at a rounded corner to provide a smooth curved surface inside the container thus reducing damage to the fruit and produce from sharp abrupt edges.

A third embodiment of the present invention provides a pallet removably attachable to a container having at least one locking portion and a locating member, the pallet including:
- a base having side members;
- at least one locking mechanism configured to engage the at least one locking portion on the container;
- a locating portion configured to receive the locating member.

Preferably, the at least one locking mechanism extends between adjacent side members.

Preferably, the at least one locking mechanism includes biasing means configured to urge the locking portion into engagement with the locking mechanism.

Preferably, the pallet includes a removable cover attachable to a bottom surface of the pallet to protect the underside of the pallet ribbing collecting contaminants and to facilitate cleaning between uses.

BRIEF DESCRIPTION OF DRAWINGS

For a more complete understanding of the invention and the advantages thereof, exemplary embodiments of the invention will be explained in more detail in the following detailed description with reference to the accompanying drawings, in which like reference signs designate like parts, and in which.

The accompanying drawings are included to provide a further understanding of the present invention and are incorporated in and constitute a part of this specification. The drawings illustrate a particular embodiment of the invention and together with the description serve to explain the principles of the invention. Other embodiments of the invention and many of the attendant advantages of the invention will be readily appreciated as they become better understood with reference to the following detailed description.

It will be appreciated that common and/or well understood elements that may be useful or necessary in a commercially feasible embodiment are not necessarily depicted in order to facilitate a more abstracted view of the embodiments. The elements of the drawings are not necessarily illustrated to scale relative to each other. It will also be understood that certain actions and/or steps in an embodiment of a method may be described or depicted in a particular order of occurrences while those skilled in the art will understand that such specificity with respect to sequence is not actually required.

DESCRIPTION OF EMBODIMENTS

Figure 1:
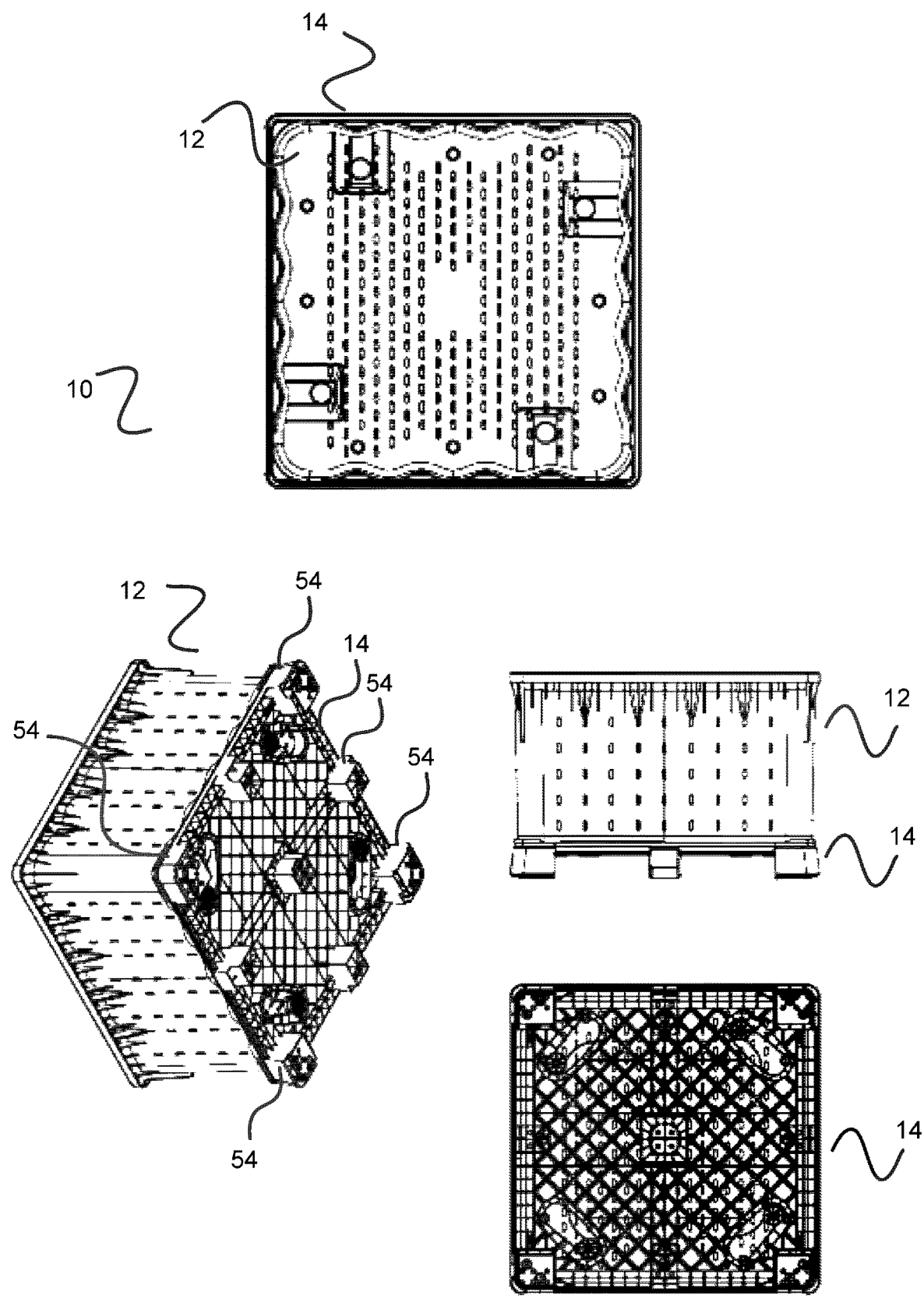
FIG. 1 shows a 4-way bin assembly according to one embodiment of the present invention.
Figure 2:
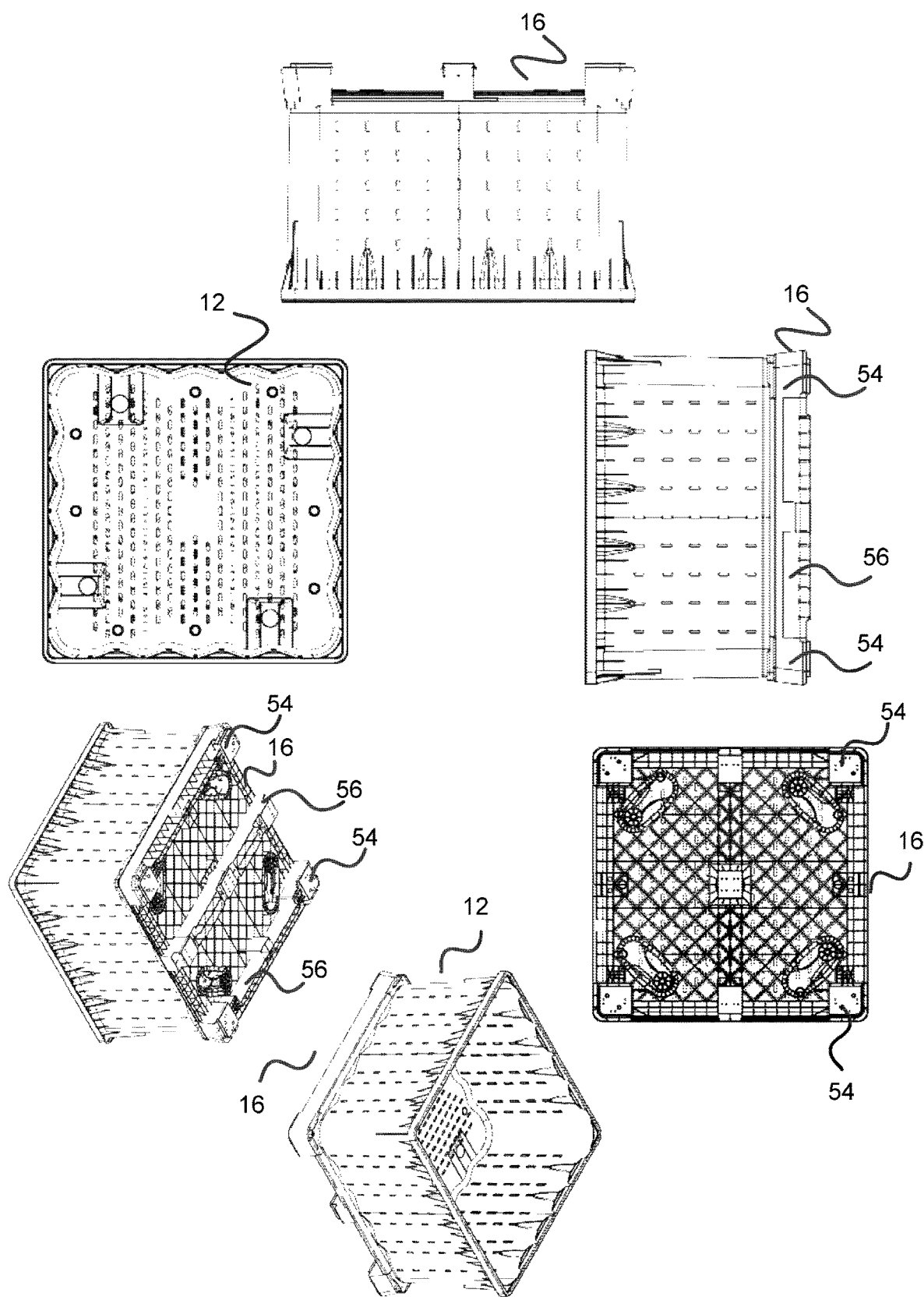
FIG. 2 shows a 2-way bin assembly according to another embodiment of the present invention.

FIGS. 1 and 2 show a reusable bin assembly 10 according to the present invention. In FIG. 1, the bin assembly 10 incudes a container 12 and a four-way pallet 14. FIG. 2 shows the container 12 in combination with a two-way pallet 16. The reusable bin assembly 10 can be made from polypropylene or polyethylene and is suitable for produce such as fruit, vegetables and meats; however, the bin assembly may also be suitable for other commodities, and the invention is not limited to the uses described herein.

Figure 5:
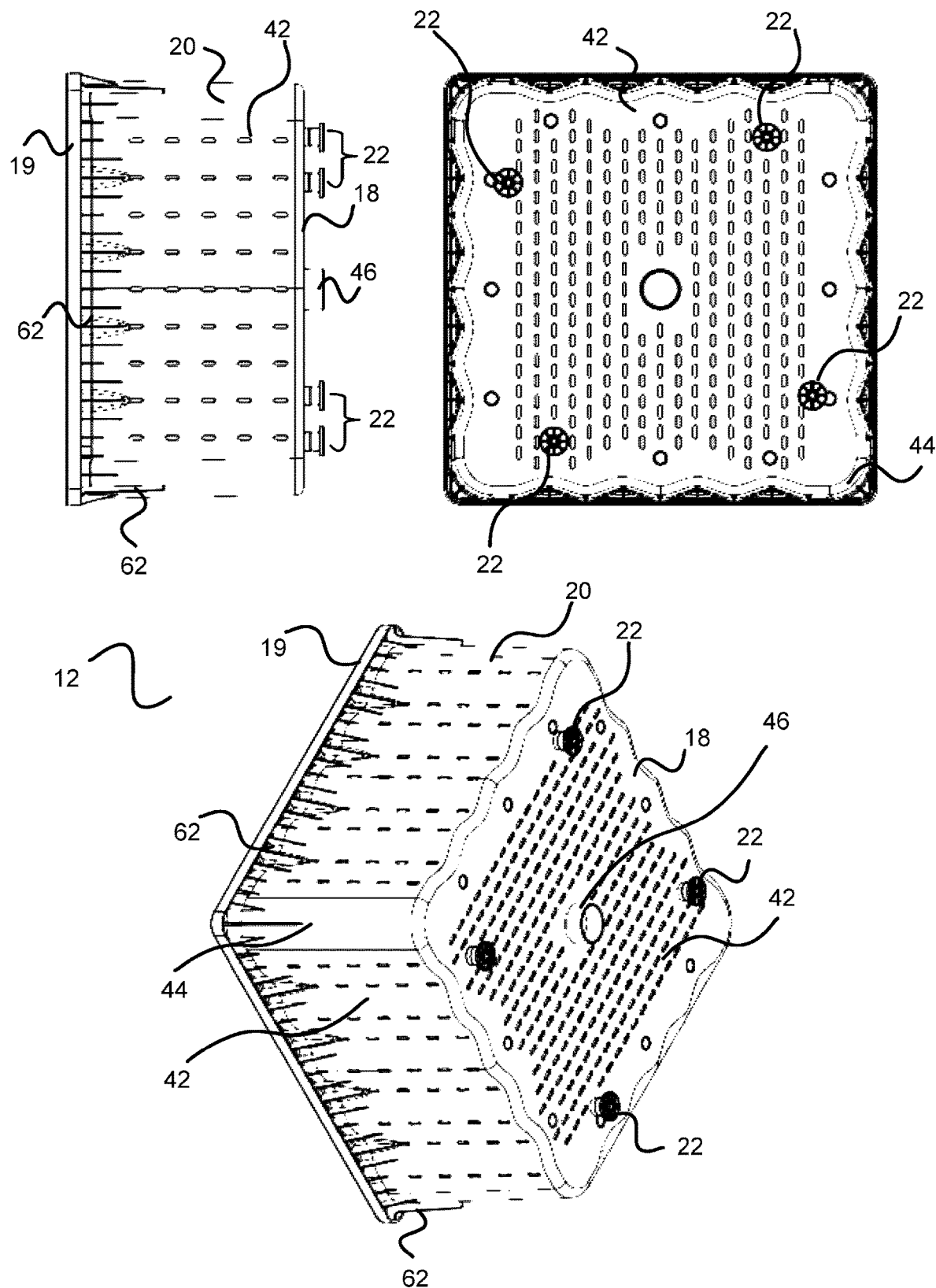
FIG. 5 shows one embodiment of a container of the bin assembly of both FIG. 1 and FIG. 2.
Figure 12:
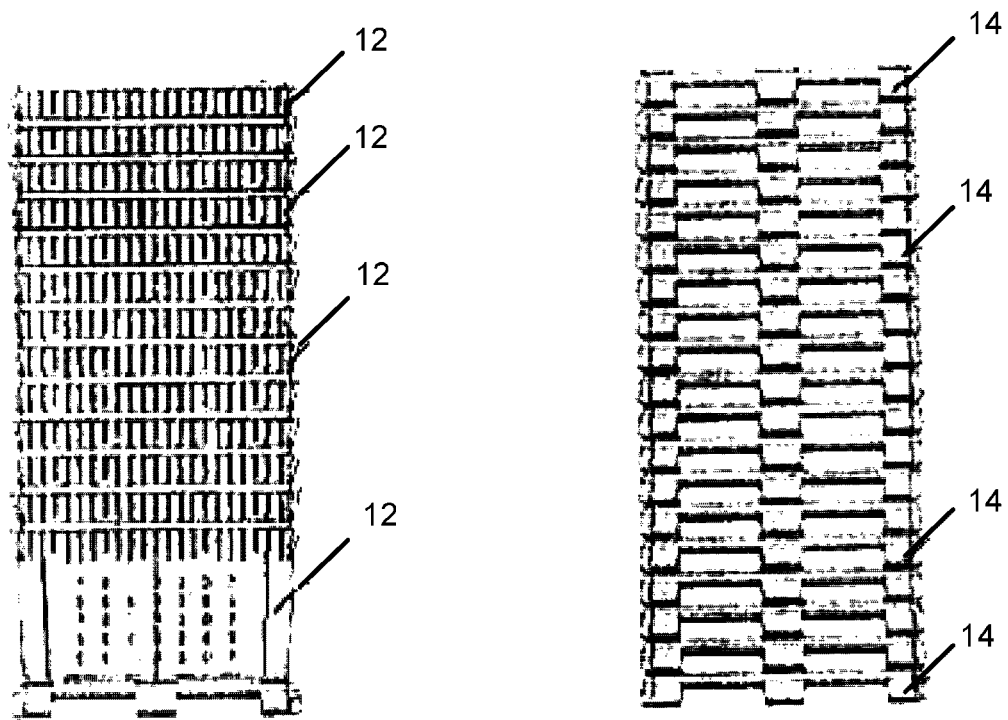
FIG. 12 shows separated bin assemblies of FIG. 5, wherein the containers are nested and the pallets are stacked.

Referring to FIG. 5, the container 12 includes a base 18 and sidewalls 20 extending upwardly and outwardly from the base 18 and terminating at a rim 19. The diverging side walls 20 allow for compact nesting of like containers 12 as seen in FIG. 12. The base 18 of the container 12 and the pallet 14, 16 each have a hollow diamond shaped design. Other shapes such as hexagonal or octagonal may also be suitable. Reinforcement in the form of several ribs 62 extending between the rim 19 and the sidewalls 20 helps prevent the containers 12 from jamming or sticking together when nested in addition to adding strength to the container 12. The container 12 includes several aeration holes 42 on the base 18 and sidewalls 20. Advantageously, because the container 12 is moulded separate from the pallet 14, 16, the aeration holes 42 can be more uniformly distributed on the base 18 and the sidewalls 20 and a larger area can be covered. Preferably, the aeration holes cover about 60-70 percent of the sidewalls and base. The aeration holes 42 allow air to circulate throughout the container 12. This may facilitate ripening of the produce during transit. As best seen in FIG. 5, the sides walls 20 are corrugated to provide impact strength as well as help to prevent produce such as fruits, vegetables and the like from rolling which can cause bruising. Additionally, the container 12 has curved corners 44 which also helps to preserve the integrity of the produce and to optimize the interior volume of the container 12.

Figure 6:
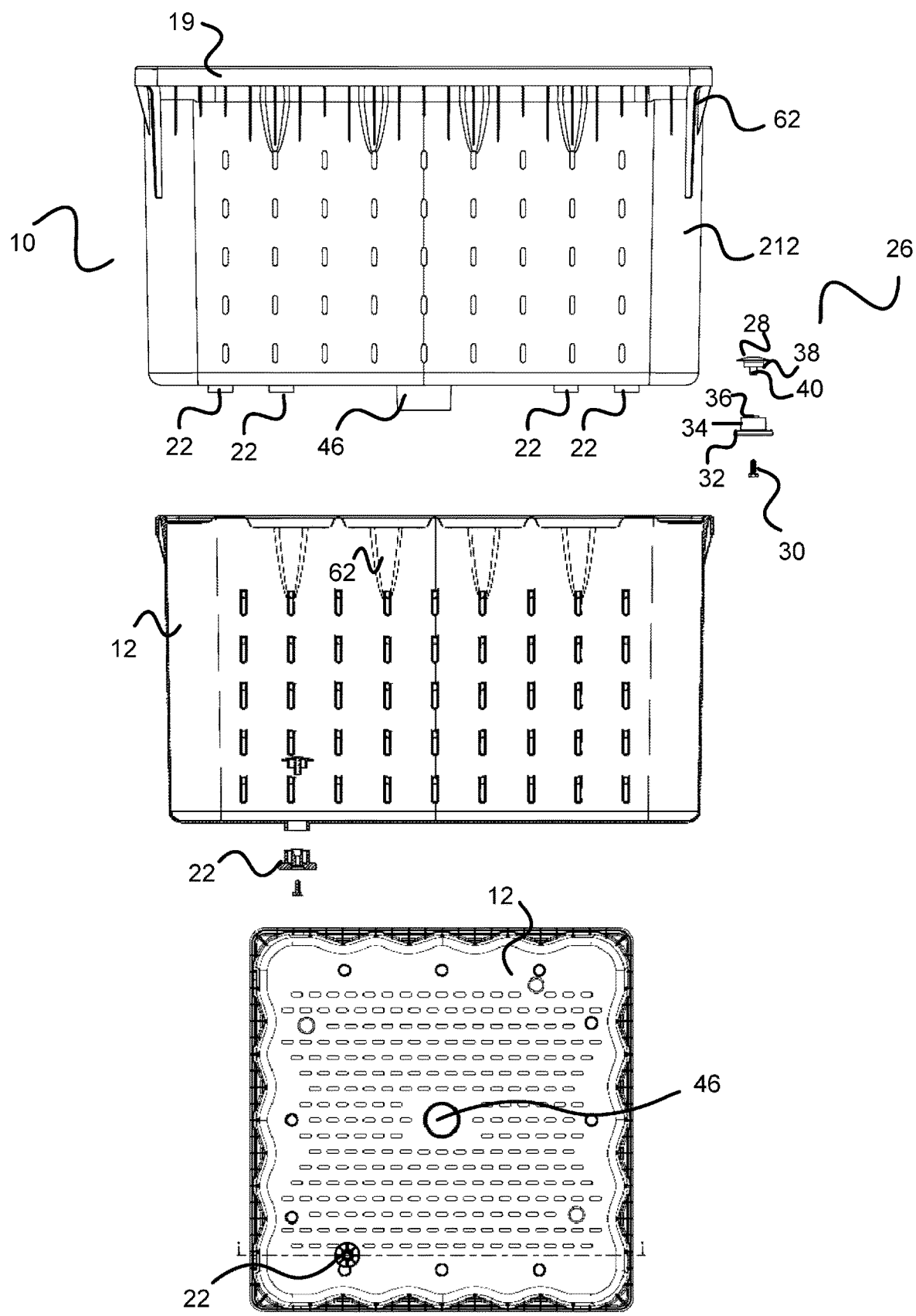
FIG. 6 shows the locking lug assembly to the container using both plastic and steel components.

Referring to FIGS. 5 and 6, the container 12 includes a first set of locking portions, in the form of four locking posts or lugs 22, which extend downwardly from the base 18 of the container 12. As will be described in detail below, each locking lug 22 cooperates with corresponding locking mechanism 24 in the pallet 14, 16 to secure the container 12 and pallet 14, 16 together. Each locking lug 22 may be integrally formed with the container 12 (see FIG. 5) or, alternatively, as shown in FIG. 6, each locking lug 22 may be attached to the container 12. As shown in FIG. 6, each locking lug 22 may include an attachment portion 26, a cover portion 28 and a fastener 30. The attachment portion 26 includes an annular flange portion 32 and a pair of concentric sleeve portions 34, 36. The cover portion 28 includes corresponding concentric protrusions 38, 40 for engagement with the sleeve portions 34, 36. Each locking lug 22 is attached to the container 12 by positioning the attachment portion 26 and the cover portion 28 on opposite sides of the container base 18 and over one of the aeration holes 42 such that the concentric sleeve portions 34, 36 receive the respective concentric protrusions 38, 40 (FIG. 6). The fastener 30 secures the attachment portion 26 and the cover portion 28 together with the container base 18 in between.

The locking lugs 22 should be positioned to ensure a balanced locking arrangement. In the embodiment shown there are four locking lugs 22, with at least one locking lug 22 positioned toward a corner portion of the container 12. Whilst more or less locking lugs 22 may be used, it will be appreciated that having a locking lug 22 at each corner portion provides strength and stability for transport of the bin assembly 10. An advantage of the attachable locking lugs 22 it that they may be easily replaced if damage or worn without having to discard the entire container 12.

Still referring to FIGS. 5 and 6, the container 12 includes a central locating spigot 46. The spigot 46 extends downwardly from the base 18 of the container 12 and is slightly longer than the locking lugs 22. The spigot 46 is generally tubular shaped, however may also be solid. As will be described in more detail below the central locating spigot 46 is used to align the container 12 and the pallet 14, 16 for engagement.

Figure 10:
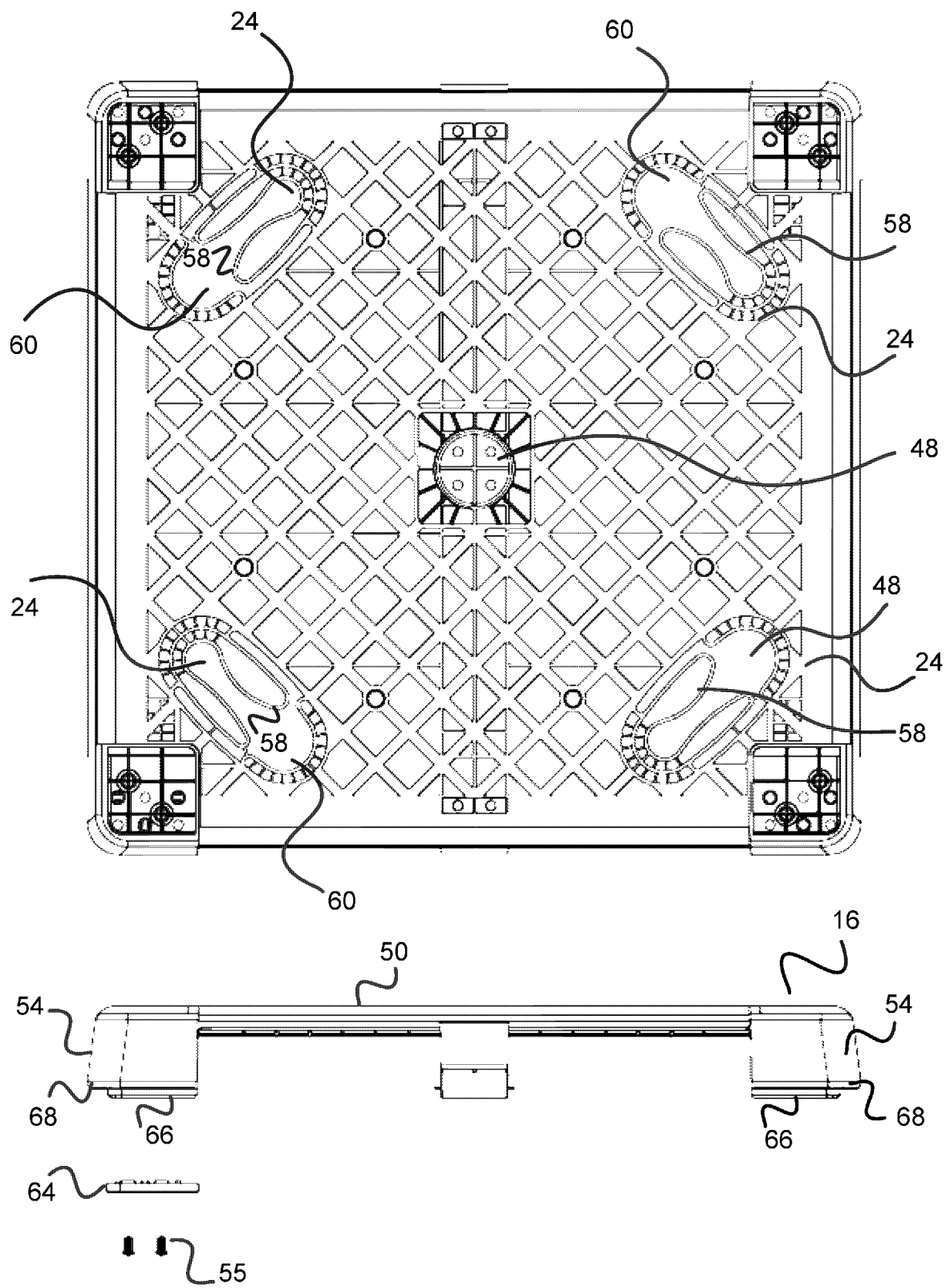
FIG. 10 shows a top view of a four-way pallet and a side view with a foot cover.
Figure 11:
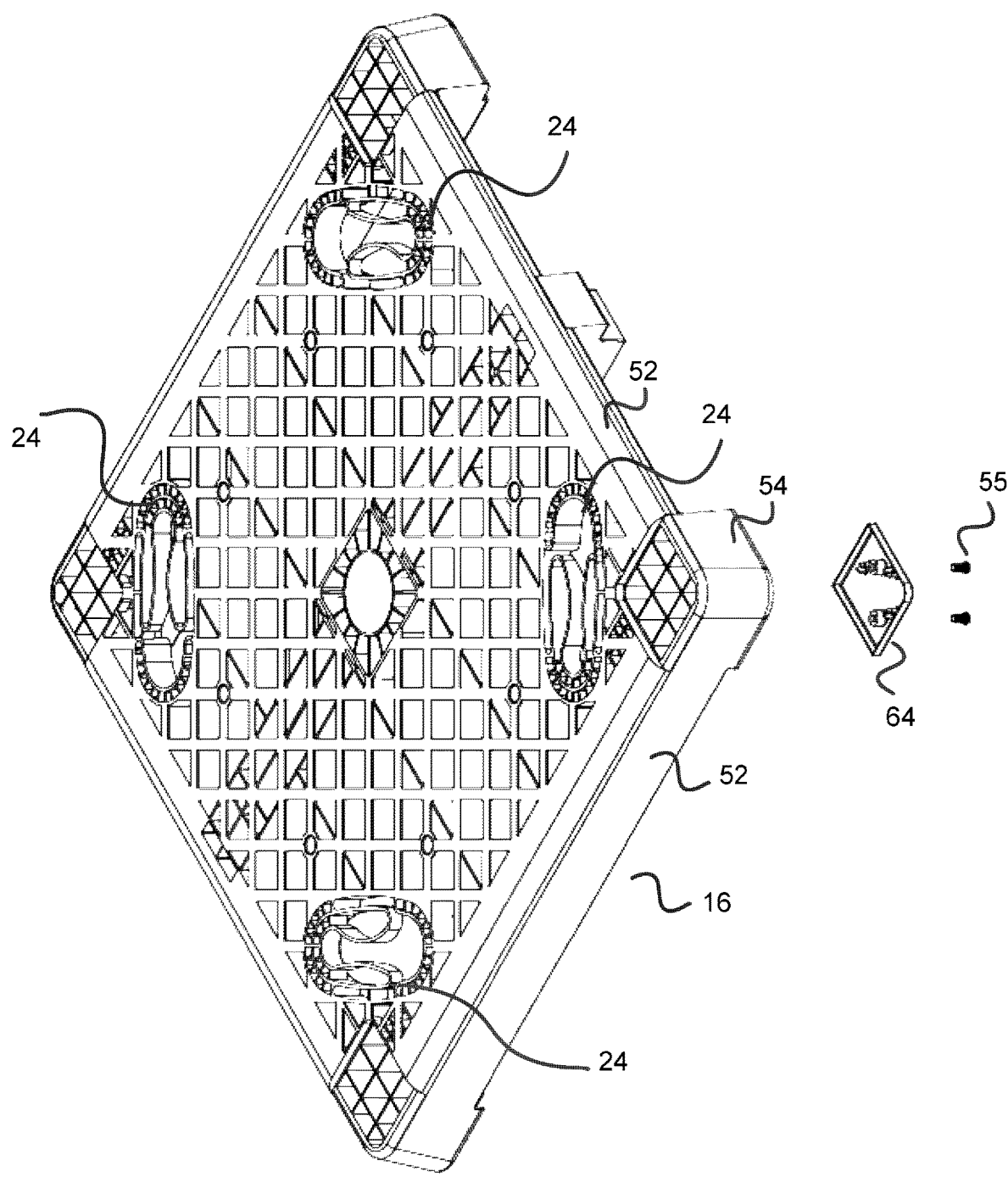
FIG. 11 shows an exploded view of a two-way pallet with foot cover and the stacking end cover.

The pallet 14, 16 will now be described in detail. As mentioned above, the pallet may be a four-way pallet 14, in which a fork-lift or other lifting vehicle may enter from any side of the pallet, or a two-way pallet 16, in which the fork-lift is limited to entering from either of two opposing sides of the pallet, as is commonly known in the field. FIGS. 2, 10 and 11 show a two-way pallet 16. Each two-way pallet 16 includes a base 50, corner feet 52 and cross beams 56 (seen in FIG. 2). The cross beams 56 extend parallel to each other, with two cross beams 56 extending between opposing corner feet 52 and a third cross beam 56 extending parallel to and between the opposing cross beams 56. This adds strength to the pallet 16 resisting it from damage or deformation during transit and storage. Referring to FIG. 1, which shows a four-way pallet 14, the cross beams are replaced with additional feet 52 disposed midway between each corner foot 52 and a center foot 52. This provides the required access area for the fork-lift or other lifting vehicle (not shown).

Figure 7:
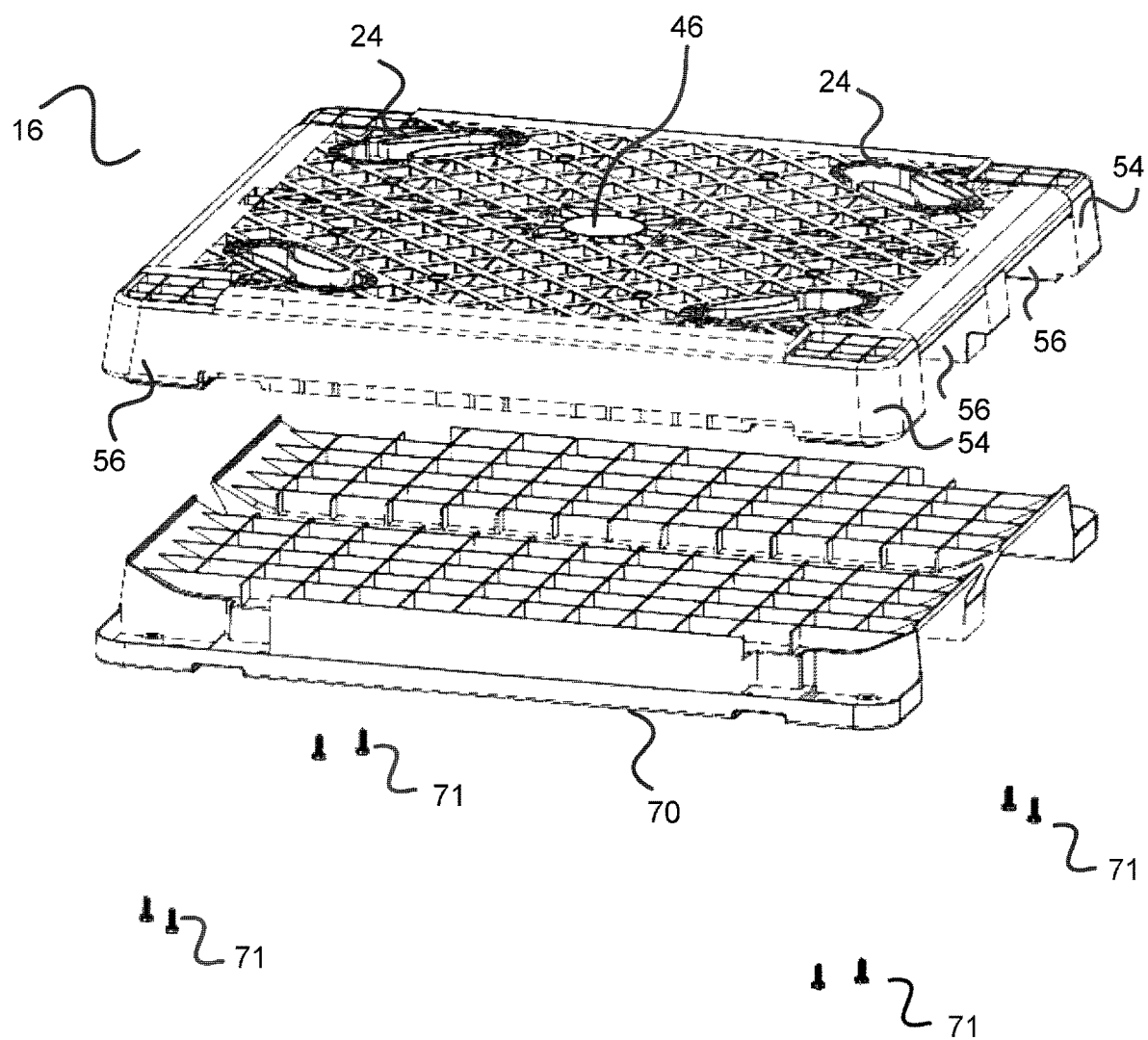
FIG. 7 shows an exploded view of a two-way pallet and bottom cover.

As best seen in FIGS. 7 and 11, the pallet 16, includes a central recess, or aperture 48 which is circular and has a diameter slightly larger than the diameter of the locating spigot 46. The locating spigot 46 and the central aperture 48 cooperate to first act as a locater for correct positioning between the container 12 and the pallet 16 and then as a pivot to lock the container 12 and the pallet 16 together. Whilst the embodiment shown is a two-way pallet 16, it will be understood that the four-way pallet 14 works in the same manner.

FIGS. 10 and 11 show a two-way pallet 16 having a plurality of locking mechanisms 24. It will be understood that the locking mechanisms 24 in the four-way pallet 14 work in the same manner. Each locking mechanism 24 corresponds to a respect locking lug 22 on the container 12 and includes biasing means in the form of a spring clip 58 housed within an aperture or slot 60. The spring clip 58 may be integrally formed with the pallet 16, or alternatively, it may be attached separately. The spring clip 58 is resiliently deformable to receive the locking lug 22. The spring clip 58 then urges toward the locking lug 22 thus locking, or securing, it in place. In FIGS. 10 and 11, the spring clip 58 is shown to be a flat spring clip and extends inwardly from either side of the slot 60. In another embodiment (not shown) the spring clip may extend from only one side of the slot 60. Preferably the spring clip is made from a metal strip, although it will be understood that other material and finish may be suitable.

As best seen in FIGS. 10 and 11, a cover portion 64 is attachable to the underside of each foot portion 54 using fasteners 55. Each foot portion 54 has an extended bottom portion 66 so that when pallets 14, 16 are stacked the extended bottom portion 66 of a top pallet 14, 16 fits within the recessed top portion 68 of an adjacent lower pallet 14 (see FIG. 12). The cover portions 64 may be integrally formed with the pallet 14, 16 or alternatively, they may be formed separately and attached using fasteners (see FIGS. 10 and 11). The cover portions 64 may be plastic, stainless steel or other suitable material.

Figure 8:
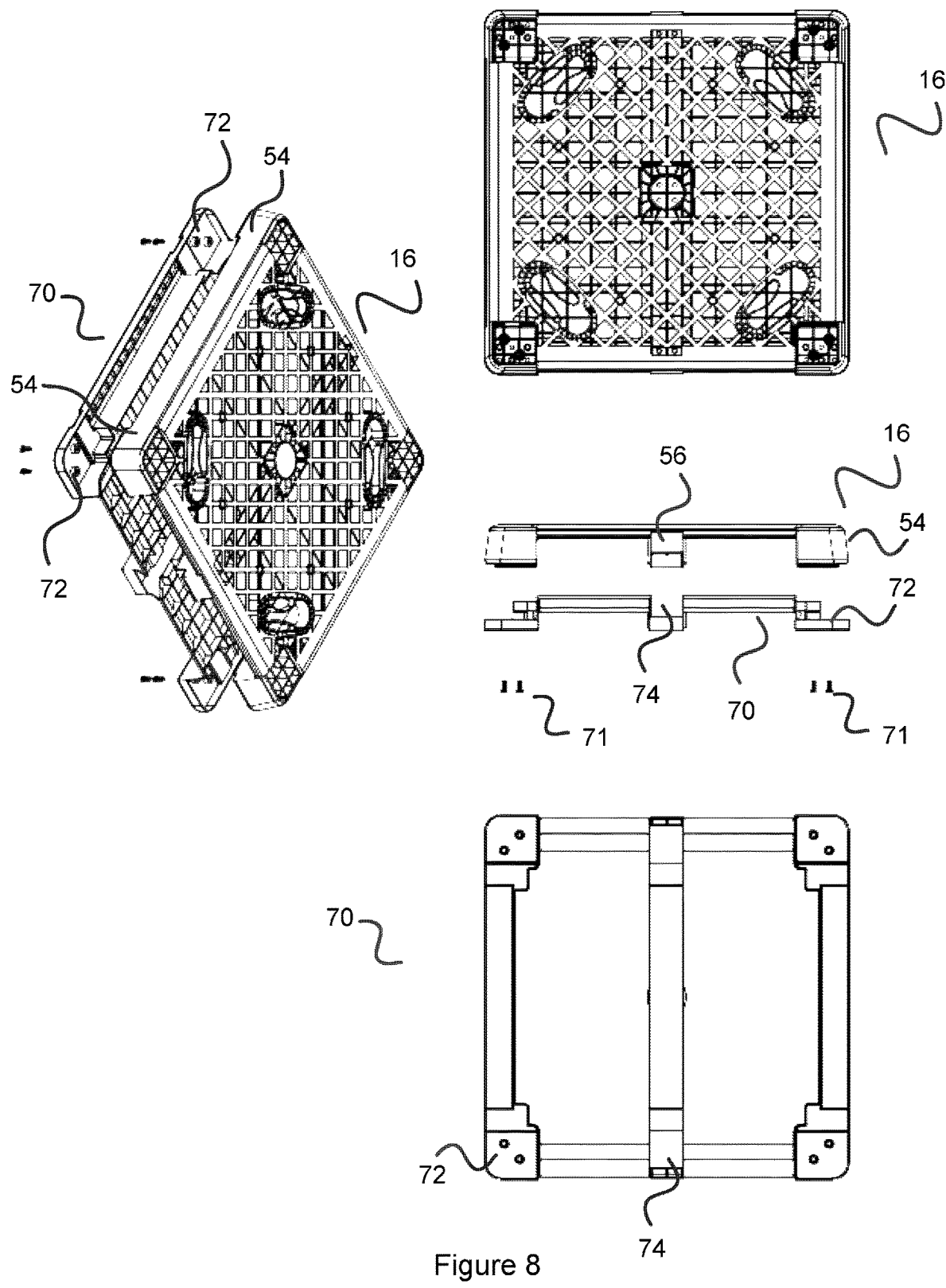
FIG. 8 shows a bottom cover assembly for a two-way pallet.
Figure 9:
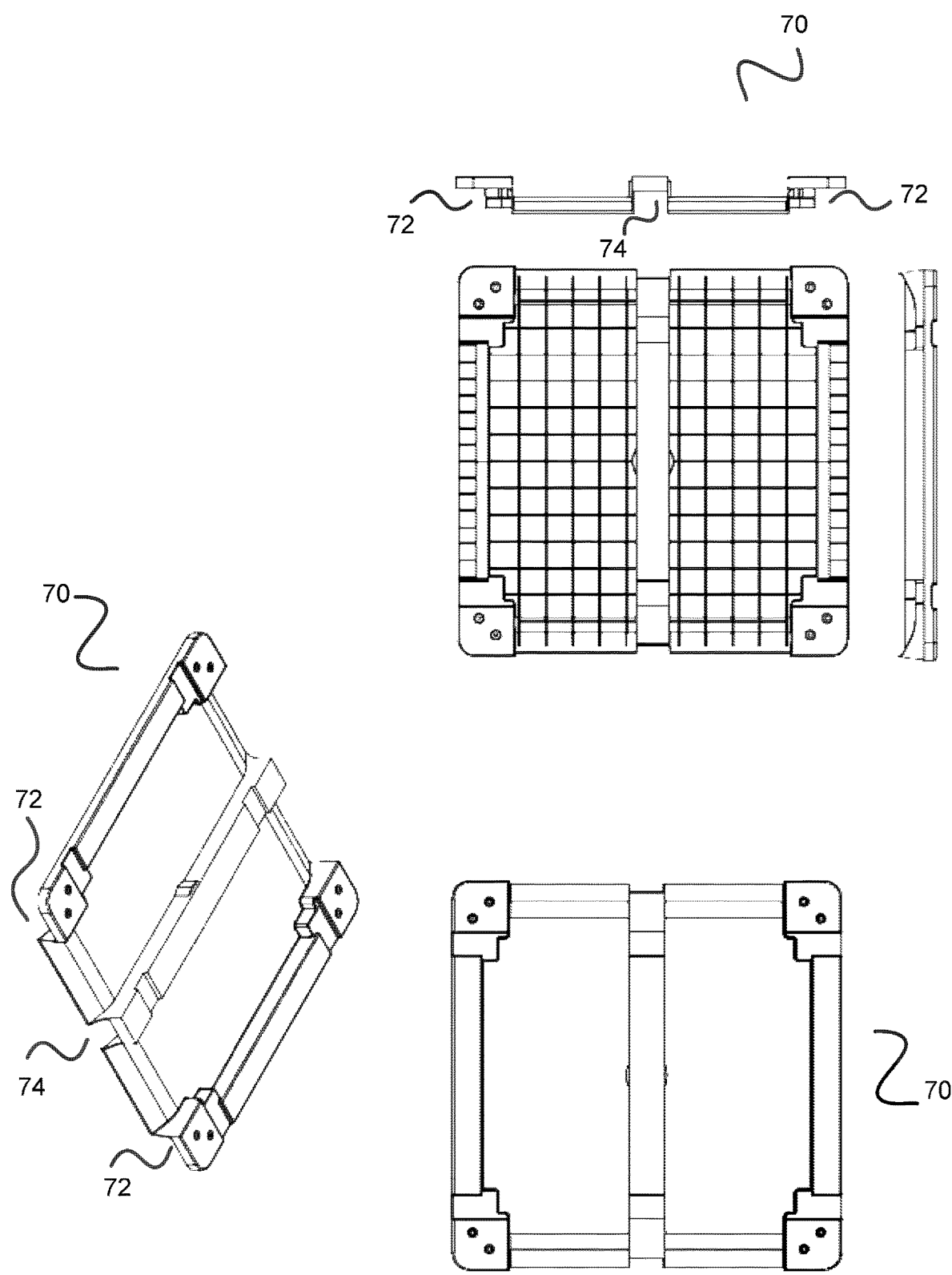
FIG. 9 shows a bottom cover for a two-way pallet.

FIGS. 7, 8 and 9 show a cover 70 which can be attached to the underside of the pallet 14, 16 to prevent leakage when the bin assembly 10 is used for cargo such as meat or poultry. The cover 70 is formed from polypropylene or polyethylene or other suitable material and does not include any aeration holes. The cover 70 is attached to the pallet 14, 16 using conventional fasteners 71 such as clips or screws. The cover 70 may be generally planar with recessed corners 72 (FIG. 8) to receive a respective corner foot 54 of the pallet 14, 16. A centre recess 74 accommodates the cross beam 56 of the two-way pallet 16. This allows versatility of the cover 70 between the two-way 16 and the four-way 14 pallet.

Figure 3:
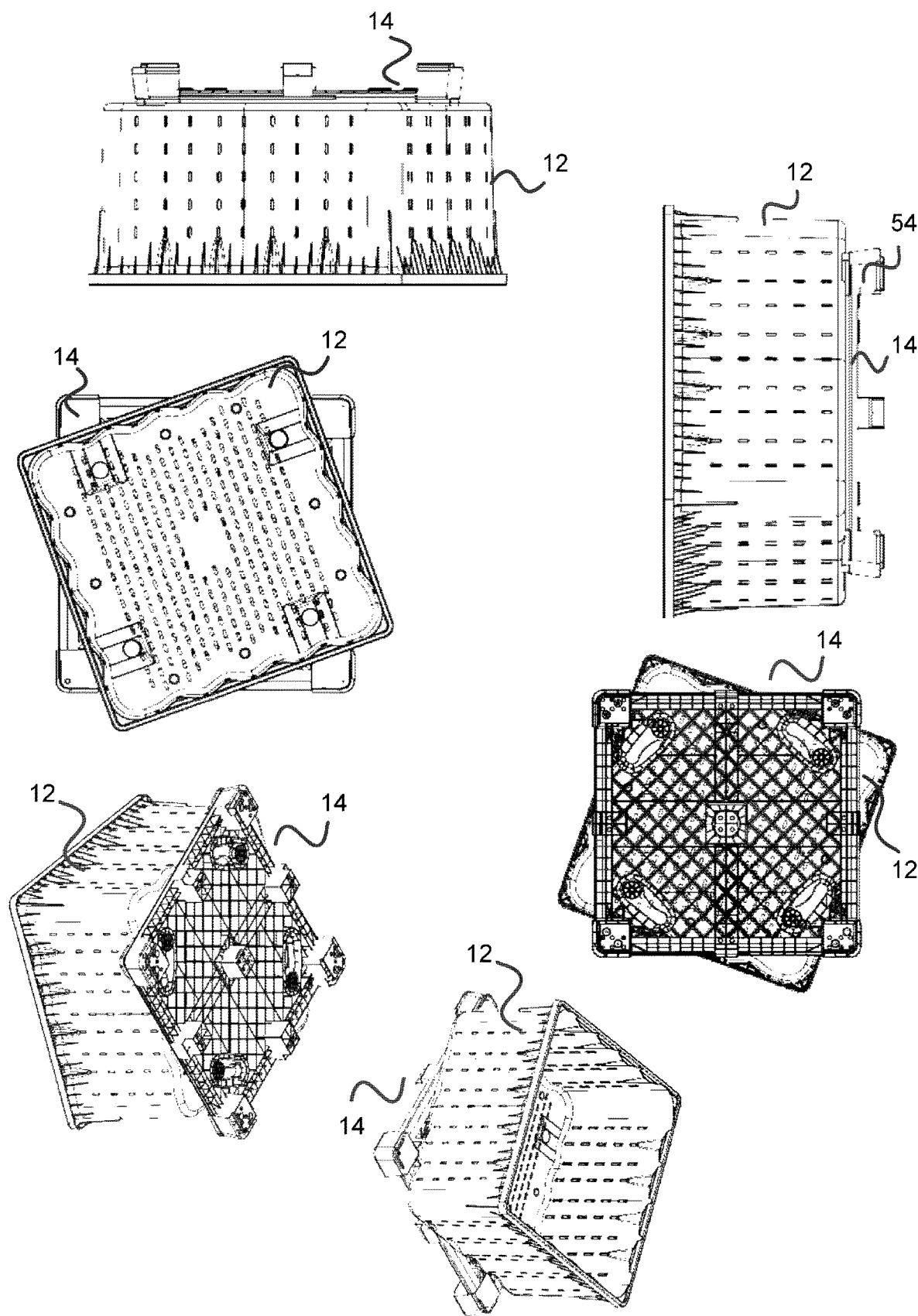
FIG. 3 shows the bin assembly of FIG. 1 in an unlocked position.
Figure 4:
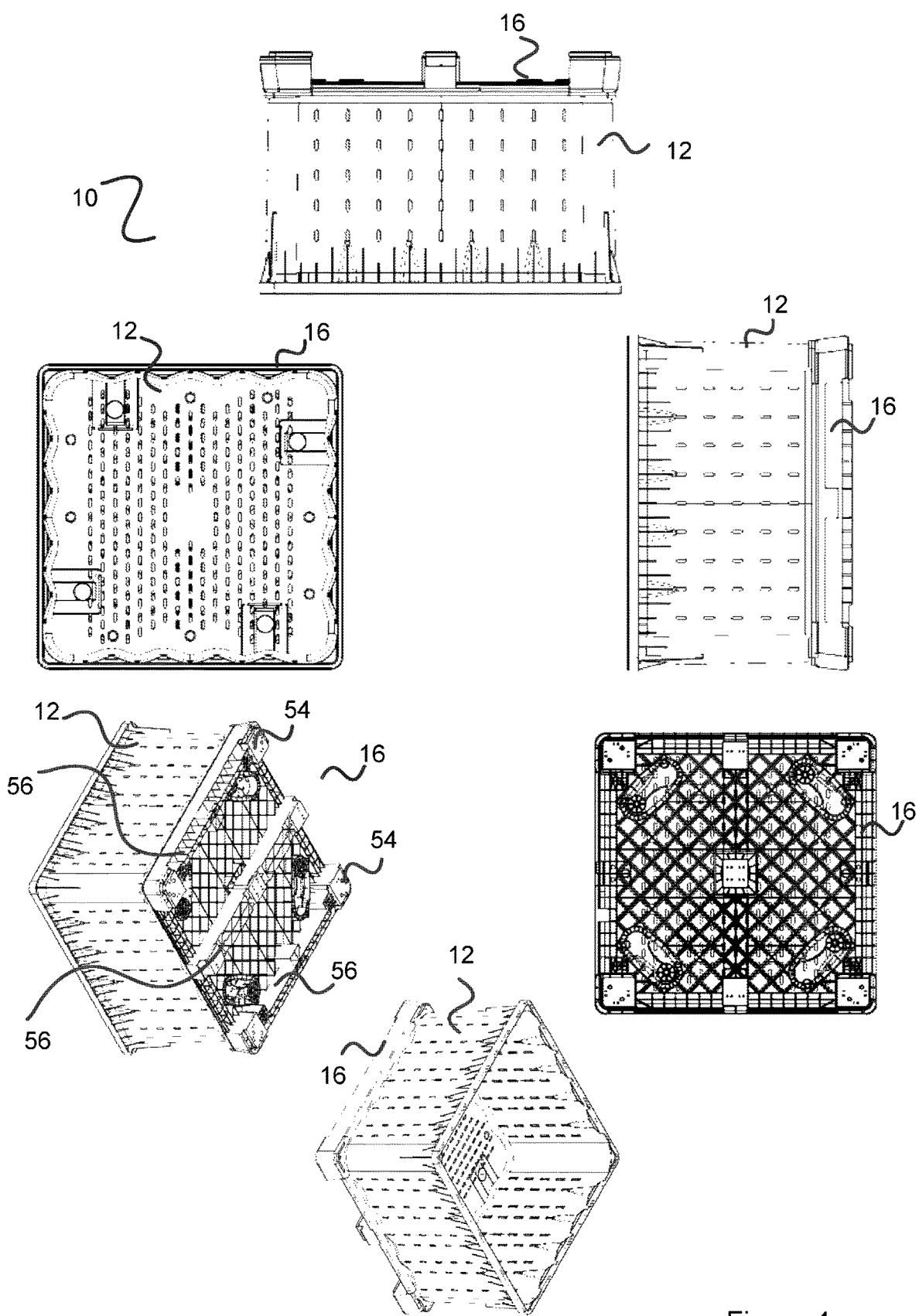
FIG. 4 shows the bin assembly of FIG. 2 in a locked position.

As best shown in FIGS. 3 and 4, the container 12 and pallet 14 are lockable together using a 'twist and lock' style method, which will be described in detail below. The container 12 and the pallet 14 may be formed from polypropylene, polyethylene or other suitable material A two-way pallet 16 and container 12 work in the same manner.

To lock the container 12 to the pallet 14, the container 12 is placed over the pallet 14 so that the central locating spigot 46 is received within the central aperture 48 and the locking lugs 22 are received within their respective locking mechanism 24 (See FIG. 3). The container 12 is then rotated or twisted so that each locking lug 22 slides within the spring clip 58 and locks into position. A top surface of the annular flange portion 32 abuts the spring clip 58 and prevents vertical disengagement of the container 12 and the pallet 14 and the spring clip 58, being biased toward the sleeve portion 36 prevents horizontal disengagement of the container 12 and the pallet 14.

The central locating spigot 46 and the central aperture 48 cooperate to first act as a locater for correct positioning between the container 12 and the pallet 14 and then as a pivot during the twisting motion for locking the container 12 and the pallet 14 together. The central locating spigot 46 ensures each locking lug 22 is correctly positioned within its locking mechanism 24, and during locking, the central locating spigot 46 and central aperture 48 act as a pivot to facilitate a sliding engagement between each locking lug 22 and the spring clip 58. The central aperture 48 may be reinforced by, for example, surrounding walls and ribs. During the twisting motion much of the load is carried by the locating spigot 46 and central aperture 48 thus the reinforcement ensures robustness. The central spigot 46 and the four locking lugs 22 engaged in the respective locking mechanisms 24 provide a very strong lock, and can only be purposefully unlocked.

Separating the bin assembly 10 into containers 12 and pallets 14 allows for more compact storage. FIG. 12 shows multiple bin assemblies 10 separated, wherein the containers 12 are nested and the pallets 14 are stacked.

Advantageously, having a bin assembly 10 where the pallet 14 is detachable from the container 12 increases the amount of bin assemblies 10 that can be accommodated within a truck. Additionally, the corrugated design achieves the same top load strength as bins currently found in the market, however it requires less material, and it reduces the environmental impact (bruising, splitting) on the produce.

Although specific embodiments of the invention are illustrated and described herein, it will be appreciated by those of ordinary skill in the art that a variety of alternative and/or equivalent implementations exist. It should be appreciated that the exemplary embodiment or exemplary embodiments are examples only and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

It will also be appreciated that in this document the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "primary", "secondary", etc. are used merely as labels, and are not intended to impose numerical requirements on or to establish a certain ranking of importance of their objects.

The invention claimed is:

1. A bin assembly comprising:
   a container having a base and sidewalls extending upwardly and outwardly from the base, the base including a centrally disposed alignment means and at least one spaced apart locking portion; and
   a pallet including a centrally disposed alignment means being complementary to the container alignment means and at least one spaced apart locking mechanism disposed on the pallet and being complementary to the at least one spaced apart locking portion, wherein the at least one spaced apart locking mechanism is configured to engage or disengage the at least one spaced apart locking portion upon relative rotation between the container and the pallet to respectively lock or unlock the pallet and the container.

2. The bin assembly of claim 1, wherein the at least one spaced apart locking mechanism extends between adjacent sidewalls of the pallet.

3. The bin assembly of claim 1, wherein:
   the at least one spaced apart locking portion is disposed on at least one corner portion of the container, and
   the at least one spaced apart locking mechanism extends between adjacent sidewalls of the pallet.

4. The bin assembly of claim 1, wherein the container includes a plurality of apertures uniformly distributed along the base and the sidewalls to facilitate airflow within the container.

5. The bin assembly of claim 1, wherein the at least one spaced apart locking mechanism includes a spring configured to urge the at least one spaced apart locking portion into engagement with the at least one spaced apart locking mechanism.

6. The bin assembly of claim 5, wherein the spring is housed within an aperture.

7. The bin assembly of claim 1, wherein the at least one spaced apart locking portion includes a plurality of locking posts removably attachable to the container.

8. The bin assembly of claim 1, wherein the at least one spaced apart locking portion is slidably received within the at least one spaced apart locking mechanism.

9. The bin assembly of claim 1, wherein like pallets are configured to stack and like containers are configured to nest.

* * * * *